UNITED STATES PATENT OFFICE.

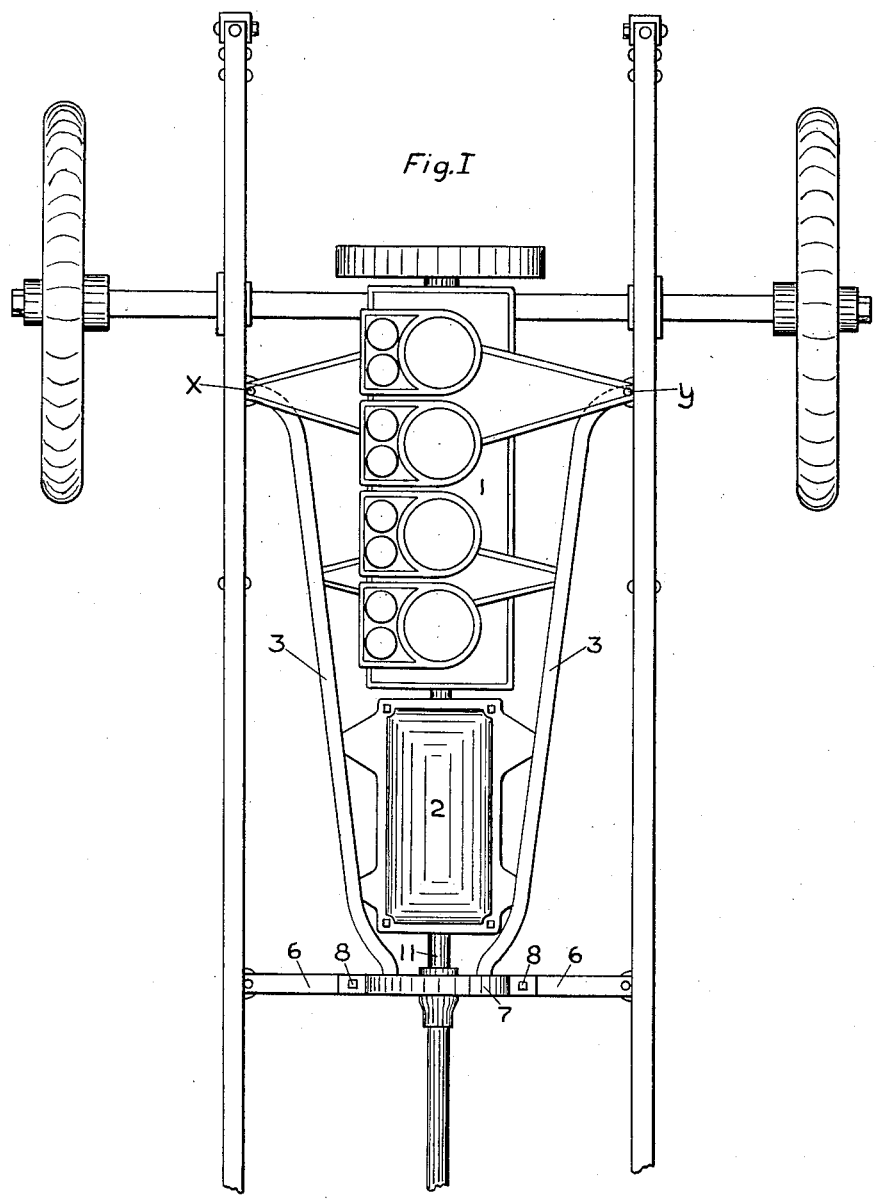

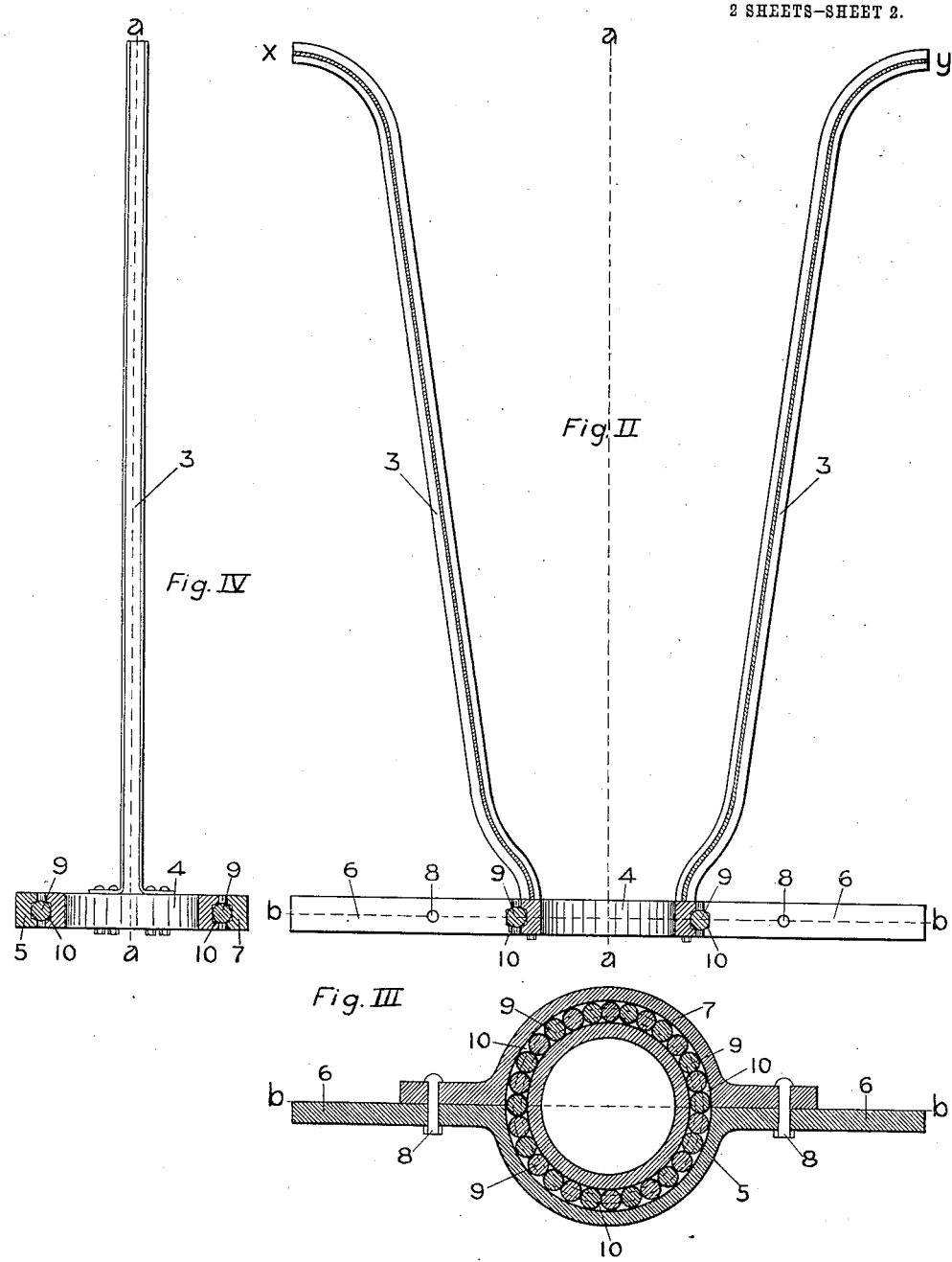

JOEL W. WEST, OF OMAHA, NEBRASKA.

AUTOMOBILE ENGINE AND TRANSMISSION SUSPENSION DEVICE.

1,031,497. Specification of Letters Patent. Patented July 2, 1912.

Application filed March 19, 1909. Serial No. 484,597.

*To all whom it may concern:*

Be it known that I, JOEL W. WEST, a citizen of the United States, residing at the city of Omaha, county of Douglas, and State of Nebraska, have invented a new and useful Automobile Engine and Transmission Suspension Device, of which the following is a specification.

My invention relates to certain improvements in the means of supporting or suspending an engine and its connected parts, such as a clutch and transmission in and upon the chassis of an automobile by means of a mechanism that will more effectually relieve the engine, clutch, transmission and the several bearings therein contained from torsional strains and stresses incident to the varying torsional movements of the chassis or frame of the automobile resulting from propelling the machine over uneven road surfaces. As tending to a better understanding of the mechanism by which this means is attained, and the peculiar principles underlying this invention it may be preliminarily pointed out that in the development of the art of automobile construction various devices have been used for the purpose of suspending the engine, its connected parts and the transmission in such a manner as to at all times keep the crank shaft, transmission shaft and their several bearings in alinement. In those cases where the engine is supported by four or more points of contact with the chassis and the transmission supported by four or more points, it has been found that the torsion of the frame resulting from propelling the vehicle over uneven roads results in throwing the mechanism out of alinement, thereby interfering with its most perfect action and resulting in unusual wear upon the several parts. To avoid this, resort has been had in some instances to a sub-frame which has been sought to be made so rigid as to render any torsion impossible, but such a device has been found to so stiffen the chassis as to seriously affect the ready adjustment of its wheel base to the varying unevenness of road surfaces, thereby making the machine ride roughly and subjecting its various parts to unusual strains. Again, another device has been resorted to known as the three point suspension by which the engine and transmission are supported upon the chassis at two points and at a third point more or less rigidly, by means of a short column or support resting upon a transverse yoke at the opposite end of the engine and transmission. This method, while an improvement upon the multiple point suspension, is still objectionable because the third point of suspension is considerably removed from the axis of the crank shaft and transmission shaft so that any twisting of the chassis results to a considerable degree in a torsion of the bearings of the engine and transmission and their several parts.

In the device or invention which is exemplified in the annexed drawings and more fully described below, a more perfect result is believed to be attained than has heretofore been accomplished, by a mechanism of the greatest simplicity and compactness and composed of but few parts, all of which are capable of being manufactured at a minimum cost and so correlated as to be capable of being very readily assembled and to accomplish the purposes intended in a more simple and practical way than has heretofore been attained.

The objects and advantages will in part be obvious from the annexed drawings and in part pointed out in the following description.

The invention accordingly consists in the features of construction, combination and arrangement, of parts which will be exemplified by the embodiments hereinafter set forth and defined as to scope and applicability by the prior art after the manner indicated in the appended claims.

The invention relates to certain improvements in the suspension of the engine, transmission, gears and clutch of an automobile. Its characteristic advantage is that it constantly maintains the crank shaft, driving shaft and their several bearings in a straight line regardless of any torsion on the automobile frame proper. The invention accomplishes this purpose by the rigid attachment of the automobile mechanism to the frame proper at two opposite points, preferably at the front of the engine; while in the rear the mechanism is suspended in a revoluble bearing, the movement of said revoluble bearing being restricted to a rotary motion substantially perpendicular to the line of the crank and transmission shafts and about the said line as an axis.

In order that this invention may be more fully understood and may be comprehensible to others skilled in the related arts, drawings illustrating several of the many possible applications of the same are annexed as part of this specification and while the controlling features of this invention may be otherwise applied by modifications falling within the intended scope of the claims, the herein disclosed embodiments are those which will ordinarily be resorted to in practice and are regarded as representing substantial improvements over many of the seeming obvious variations of the same.

In the appended drawings corresponding parts are referred to by like characters of reference throughout all the figures.

Figure I is a top plan view of the invention attached to the chassis of an automobile. The engine base (1) and transmission casing (2) are represented here as separate castings and are held relatively rigid by the sub-frame (3). Fig. II is a longitudinal sectional view through the axis of the movable or revoluble rear support. Fig. III is a transverse vertical section along b—b of Fig. II. Fig. IV is a longitudinal vertical section along a—a of Fig. II.

Continuing the description with the necessary references to tne drawings, (3) represents a sub-frame to suitably hold the several parts of an automobile's motive mechanism in a relatively rigid position. In case the engine and transmission of the automobile be mounted in a continuous and rigid casting as in what is known as the "unit construction", this sub-frame may be dispensed with. This sub-frame is attached rigidly to the automobile frame proper at X and Y; at the rear end it is attached rigidly to the ring (4). In case of the "unit construction" mentioned above the annular ring would be keyed rigidly directly to the casting of the transmission or constructed integrally with it, said casting through the engine base with which it is rigidly connected, being fastened rigidly to the chassis in front at X and Y. This ring rests in a semi-annular bearing (5) which is made integrally with the arms (6), said arms being attached rigidly to the automobile frame. This annular ring (4) is held in the semi-annular bearing (5) by the semi-annular cap (7), the cap being held in place by bolts (8). This ring (4) may be made revoluble in its bearing (5) by means of any suitable anti-friction bearings, ball bearings being here shown, in which the balls (9) run in the race (10), although any other suitable anti-friction bearings may readily be used. The engine and transmission (1) and (2) are most suitably attached to the sub-frame (3) in such manner that the axis of the transmission shaft (11) will be coincident with the center of the ring (4) and with such arrangement and construction of parts that the transmission shaft (11) may revolve freely through the center of the ring (4) without contact with it.

It will thus be perceived that I have succeeded in devising means well adapted to achieve the objects and ends in view. Thus, from purely structural considerations it will be obvious that it is notable for the characteristic simplicity arising from the few parts of which it is composed. Furthermore, these parts are none of them of an involved design, but on the contrary, are of such nature as enables them to be made with the greatest facility by the various appliances to be found in any well equipped machine shop. Consequently the manufacture can be carried on readily and with cheapness. It will also be observed that by this device there has been accomplished a means by which the engine and transmission may adjust themselves with absolute precision to any torsion of the chassis of the automobile without in the least degree subjecting any of its parts to any strain or disalinement whatever. And likewise the engine and transmission may adjust themselves to any torsion of the chassis and at all times maintain the crank shaft, transmission shaft and propeller shaft and all their bearings in perfect alinement, whatever torsion there may be, being at all times about the said transmission shaft as an axis.

As many changes could be made in the above construction and many apparently different embodiments in the invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which as matter of language might be said to fall therebetween.

Now, having described my invention, what I claim and desire to secure by Letters Patent is,—

1. In a motor vehicle, the combination of a main frame or chassis, a motor and a transmission shaft therefor, a suitable base for said motor and its transmission shaft, said base being supported at its forward end on said main frame, and at its rear provided with a hollow journal concentric to the transmission shaft, through which journal the said shaft extends in spaced relation, and a support for said journal from the main frame in which said journal is adapted to have relative rotation as a result of the torsion of the main frame, substantially as described.

2. In a motor vehicle, the combination of a main frame or chassis, a motor, a transmission shaft rearwardly extending from and connected to said motor, and extending longitudinally of the said frame, a bed for said motor supported at its forward end on said main frame, and at its rear provided with a perpendicularly arranged bearing ring, through which said transmission shaft extends in spaced relation thereto, and a support from said main frame in which said bearing ring is adapted to have relative rotation, as and for the purpose set forth.

JOEL W. WEST.

Witnesses:
G. MASS,
JOHN G. LOOS.